United States Patent
Nomura et al.

(10) Patent No.: US 7,380,121 B2
(45) Date of Patent: May 27, 2008

(54) IMAGE PROCESSING DEVICE, IMAGE PROCESSING METHOD, IMAGE PROCESSING PROGRAM, AND COMPUTER-READABLE RECORDING MEDIUM STORING THE SAME THEREIN

(75) Inventors: Tatsuo Nomura, Soraku-gun (JP); Syouichiro Yoshiura, Ikoma-gun (JP); Tsutomu Yoshimoto, Yamatotakada (JP)

(73) Assignee: Sharp Kabushiki Kaisha, Osaka (JP)

( * ) Notice: Subject to any disclaimer, the term of this patent is extended or adjusted under 35 U.S.C. 154(b) by 797 days.

(21) Appl. No.: 10/655,658

(22) Filed: Sep. 5, 2003

(65) Prior Publication Data

US 2004/0049684 A1    Mar. 11, 2004

(30) Foreign Application Priority Data

Sep. 10, 2002   (JP)   ............... 2002-264402

(51) Int. Cl.
*H04L 9/00*   (2006.01)
(52) U.S. Cl. ............... 713/166; 726/5; 726/26
(58) Field of Classification Search ............. 713/166
See application file for complete search history.

(56) References Cited

U.S. PATENT DOCUMENTS

| | | | | |
|---|---|---|---|---|
| 5,450,593 A | * | 9/1995 | Howell et al. ............... 726/21 |
| 6,163,383 A | * | 12/2000 | Ota et al. ............... 358/1.1 |
| 6,189,103 B1 | * | 2/2001 | Nevarez et al. ............... 726/5 |
| 2003/0223089 A1 | * | 12/2003 | Laursen et al. ............ 358/1.15 |
| 2007/0076238 A1 | * | 4/2007 | Odagiri ............... 358/1.14 |

FOREIGN PATENT DOCUMENTS

| | | |
|---|---|---|
| JP | 11-028850 | 2/1999 |
| JP | 2001-306173 | 2/2001 |

* cited by examiner

*Primary Examiner*—Kambiz Zand
*Assistant Examiner*—Jason K Gee
(74) *Attorney, Agent, or Firm*—David G. Conlin; David A. Tucker; Edwards Angell Palmer & Dodge LLP

(57) ABSTRACT

An image processing device of the present invention includes a management section for storing an authentication level set in accordance with the volume of image processing which is predicted in accordance with at least one of day and time. When a request for image processing to image data is made, an authentication section changes the authentication level for user authentication in accordance with at least one of day and time. Then, in accordance with this authentication result, requested image processing is performed.

16 Claims, 5 Drawing Sheets

IMAGE PROCESSING DEVICE, IMAGE PROCESSING METHOD, IMAGE PROCESSING PROGRAM, AND COMPUTER-READABLE RECORDING MEDIUM STORING THE SAME THEREIN

FIELD OF THE INVENTION

The present invention relates to an image processing device such as digital multifunction device and an image processing method, and more specifically, relates to an image processing device and an image processing method including a security function for image data subjected to processing.

BACKGROUND OF THE INVENTION

Conventionally, for ensuring the confidentiality of information such as secret information, various approaches to security have been proposed. For example, secret information is encrypted, and the encrypted secret information is managed with the addition of authentication information such as password thereto. When the browse and use of the secret information is needed, user authentication is performed by a predetermined authentication method using a password or the like. When this authentication confirms user's validity, the encrypted secret information is decrypted to permit the browse and use of the secret information. In such a manner, user authentication of secret information is performed through authentication information such as password to protect secret information against leakage of secret information, tampering of secret information, interference with use of secret information, and other risks, thereby strictly managing secret information.

In recent years, there has been a tendency to the emphasis on security to digital multifunction devices used by a unspecified number of users, such as digital multifunction devices with such functions as copy, fax, printer, and scanner, which are installed in offices and other places. That is, when data processing such as image processing is performed with a digital multifunction device, data are protected against data leakage and data tampering, and other risks, thereby strictly managing secret information. More specifically, as in the case of the above secret information, data is encrypted, and authentication information is added to the encrypted data. When data processing for the data is requested to the digital multifunction device, user authentication is performed in accordance with the authentication information added to the data. When this authentication confirms the identity of a user, the encrypted data are decrypted to permit a predetermined data processing with the digital multifunction device.

One example of such a digital multifunction device with a security system is a printing device disclosed in Japanese Laid-Open Patent Application No. 28850/1999 (Tokukaihei 11-28850; published on Feb. 2, 1999). The printing device disclosed in Japanese Laid-Open Patent Application No. 28850/1999 is arranged so that printing of a confidential document and a private document is carried out after receiver authentication for the confidential document and the private document is performed through receiver's input of an ID and a password as authentication information.

Moreover, Japanese Laid-Open Patent Application No. 293036/1997 (Tokukaihei 9-293036; published on Nov. 11, 1997; counterpart U.S. Pat. No. 6,163,383 (issued on Dec. 19, 2000)) discloses a printing device that performs user authentication in accordance with authentication condition, which are attached previously to data to be printed, for authenticating a user of the printing device. In this printing device, the authentication condition attached to the data includes authentication levels set in accordance with desired security levels such as level of data importance. Therefore, user authentication based on the authentication condition is performed in accordance with the set authentication levels, and the user authentication is performed strictly or leniently in accordance with the security levels.

Further, Japanese Laid-Open Patent Application No. 2001-306173 (Tokukai 2001-306173; published on Nov. 2, 2001) discloses an information processor that performs user authentication with authentication levels changed in accordance with an amount of power consumption and an installation location of the information processor. Specifically, the authentication levels are changed by changing complexity of a password inputted when user authentication is performed. That is, the information processor performs user authentication by automatically changing the password in accordance with the possibility of unauthorized use by a third party in such a manner that a complex password is used in a situation in which there is a high possibility of unauthorized use, and an easy password is used in a situation in which there is a low possibility of unauthorized use. This makes it possible to change a security level in accordance with an environment in which the information processor is used.

As described above, digital multifunction devices and information processors with various security systems have been proposed.

However, the conventional printing devices have the problem that slowdowns of data processing such as image processing may be caused in the printing devices due to too much emphasis on the security aspect. That is, in the conventional printing device, regardless of the volume of data processing in the print processing device, consideration is given to ensuring of security including the protection against data leakage, data tampering, and other risks. On this account, even when the large volume of data processing rushes to the print processing device, user authentication is performed at a predetermined authentication level which is set in accordance with importance of data. As a result, it takes much time to authenticate users, thus causing slowdowns of data processing in the printing device.

Furthermore, this problem would also occur when the security system carried out in the information processor disclosed in Japanese Laid-Open Patent Application No. 2001-306173 is applied to a printing device. That is, in the case where the security system of Japanese Laid-Open Patent Application No. 2001-306173 is applied to a printing device, the user authentication level changes in accordance with the possibility of unauthorized use of data in the printing device, not the volume of data processing in the printing device. In other words, the user authentication level does not change in accordance with the volume of data processing requested to the printing device. Therefore, in the case where the large volume of data processing is required to handle, it takes much time to authenticate users. This might cause slowdowns of data processing in the printing device.

Besides, unlike the information processor disclosed in Japanese Laid-Open Patent Application No. 2001-306173, a printing device is installed at a predetermined location and used by an unspecified number of users. On this account, it is difficult to determine the possibility of unauthorized use by a third party and change an authentication level in accordance with power consumption and installation location of the printing device.

Thus, the conventional printing devices do not change a user authentication level in accordance with the volume of data processing requested to the printing devices. In other words, in the conventional printing devices, regardless of the volume of data processing in the print processing devices, data security is ensured only in accordance with level of data importance. Therefore, a requested large amount of data processing might cause a decrease in processing power of the printing device. Further, such a decrease in processing power of the printing device results in reduction in the commercial value of the printing device.

SUMMARY OF THE INVENTION

The present invention is attained to solve the conventional problem, and an object of the present invention is to provide an image processing device and an image processing method which can efficiently perform processing of inputted image data while ensuring the security of image data.

In an image processing device of the present invention which is provided with an authentication section for performing authentication of a user and an image processing section for performing requested image processing to image data in accordance with a result of authentication by the authentication section, included is a management section for storing an authentication level set in accordance with at least one of day and time, and the authentication section changes the authentication level in accordance with at least one of day and time.

According to the above arrangement, the authentication level can be changed for user authentication in accordance with at least one of day and time. This makes it possible to set the authentication level in accordance with the volume of image processing in the image processing device, so that the image processing device can perform image processing efficiently. Moreover, the authentication level can be set in accordance with the volume of image processing and the possibility of unauthorized use of image data in the image processing device, so that efficient image processing in the image processing device can be performed with the consideration for the security of image data.

This is because the volume of image processing in the image processing device and the number of users of the image processing device change in accordance with at least one of day and time. More specifically, generally, the image processing device installed at a predetermined position e.g. in a office is used by unspecified number of users. Therefore, the volume of image processing performed in the image processing device varies depending on the number of users which changes in accordance with at least one of day and time. That is, increase of the users increases the volume of image processing, and decrease of the users decreases the volume of image processing.

Meanwhile, decrease in the number of users for the image processing device increases the possibility of unauthorized use of image data, such as intentional smuggling of image data. Further, increase in the number of users for the image processing device decreases the possibility of unauthorized use of image data in the image processing device. That is, the possibility of unauthorized use of image data also changes with the number of users changing in accordance with at least one of day and time.

Further, the time required for user authentication varies depending on the amount of information used for authentication, i.e. the authentication level. Therefore, change of the authentication level in accordance with the possibility of unauthorized use of image data enables adjustment of the time required for user authentication.

In this connection, as in the above arrangement, the authentication level is set in accordance with at least one of day and time. This makes it possible to change the authentication level in accordance with the volume of image processing in the image processing device and the number of users for the image processing device. That is, in the case where the volume of image processing is large, it is considered that there exist many users and there is a low possibility of unauthorized use of image data. Therefore, the authentication level for user authentication is set to a relatively lenient authentication level. In the case where there exist many users, the security of image data can be ensured at a lenient authentication level. Moreover, since user authentication is performed at a relatively lenient authentication level, it is possible to reduce the time required for user authentication.

On the other hand, in the case the volume of image processing is small, it is considered that the possibility of unauthorized use of image data increases. Therefore, user authentication must be performed at a strict authentication level. However, even if user authentication performed at a relatively strict authentication level increases the time required for user authentication, efficiency in image processing of the image processing device is not affected because the volume of image processing is small.

Thus, setting the authentication level in accordance with at least one of day and time enables efficient image processing in the image processing device with the consideration for the security of image data.

Further, it is preferable that the image processing device includes a time management section for managing at least one of the day and the time.

According to the above arrangement, on the basis of information such as date, day of the week, and time of the day, which are managed by the time management section, it is possible to set the authentication level set in accordance with at least one of day and time. This makes it possible to appropriately change the authentication level in accordance with at least one of day and time. Therefore, in accordance with at least one of day and time, it is possible to consider the security of image data and to efficiently perform image processing in the image processing device.

Further, in an image processing method of the present invention including: performing authentication of a user in accordance with an authentication level set previously and performing requested image processing to image data in accordance with a result of the authentication, the authentication level is changed in accordance with at least one of day and time.

According to the above method, since the authentication level can be changed appropriately in accordance with at least one of day and time, the authentication level can be changed in accordance with the volume of image processing in the image processing device and the number of users for the image processing device. This makes it possible to efficiently perform image processing in the image processing device with the consideration for the security of image data.

For a fuller understanding of the nature and advantages of the invention, reference should be made to the ensuing detailed description taken in conjunction with the accompanying drawings.

DESCRIPTION OF THE EMBODIMENTS

The following will describe one embodiment of the present invention with reference to FIGS. 1 through 5.

A digital multifunction device of the present embodiment (image processing device) has such functions as copy, fax, printer, and scanner, and the digital multifunction device has further a security function for protecting image data subjected to data processing (image processing) in the digital multifunction device. That is, in receiving a request for data processing of the image data inputted to the digital multifunction device, the digital multifunction device of the present embodiment performs authentication of a user who has requested the data processing. Only when this authentication confirms user's validity, the digital multifunction device performs data processing for the requested image data. Such a security control protects against leakage and tampering of image data, and other risks (hereinafter referred to as "unauthorized use of image data") in the digital multifunction device.

The above digital multifunction device performs security control by automatically changing a user authentication level in accordance with an environment of an installation location, e.g. office, where the digital multifunction device is installed. Here, the authentication level is a measure indicating the severity of authentication during user authentication. A reliance upon authentication (security) for the protection against unauthorized use of image data in the digital multifunction device changes depending on the authentication level. In addition, the environment of the installation location in the present embodiment refers to the volume of data processing that is the volume of image data of which data processing is requested to the digital multifunction device (the volume of image processing) and the possibility of unauthorized use of image data in the digital multifunction device, varying in accordance with day and time.

That is, by changing the authentication level in accordance with at least one of day and time, the above digital multifunction device can change the authentication level in accordance with a change in the volume of data processing requested to the digital multifunction device and the possibility of unauthorized use of image data. In other words, utilizing a correlation between the change in the volume of data processing in the digital multifunction device and the possibility of unauthorized use of image data, varying in accordance with day and time, realizes the compatibility between the efficiency of data processing in the digital multifunction device and the ensuring of image data security.

Figure 2:
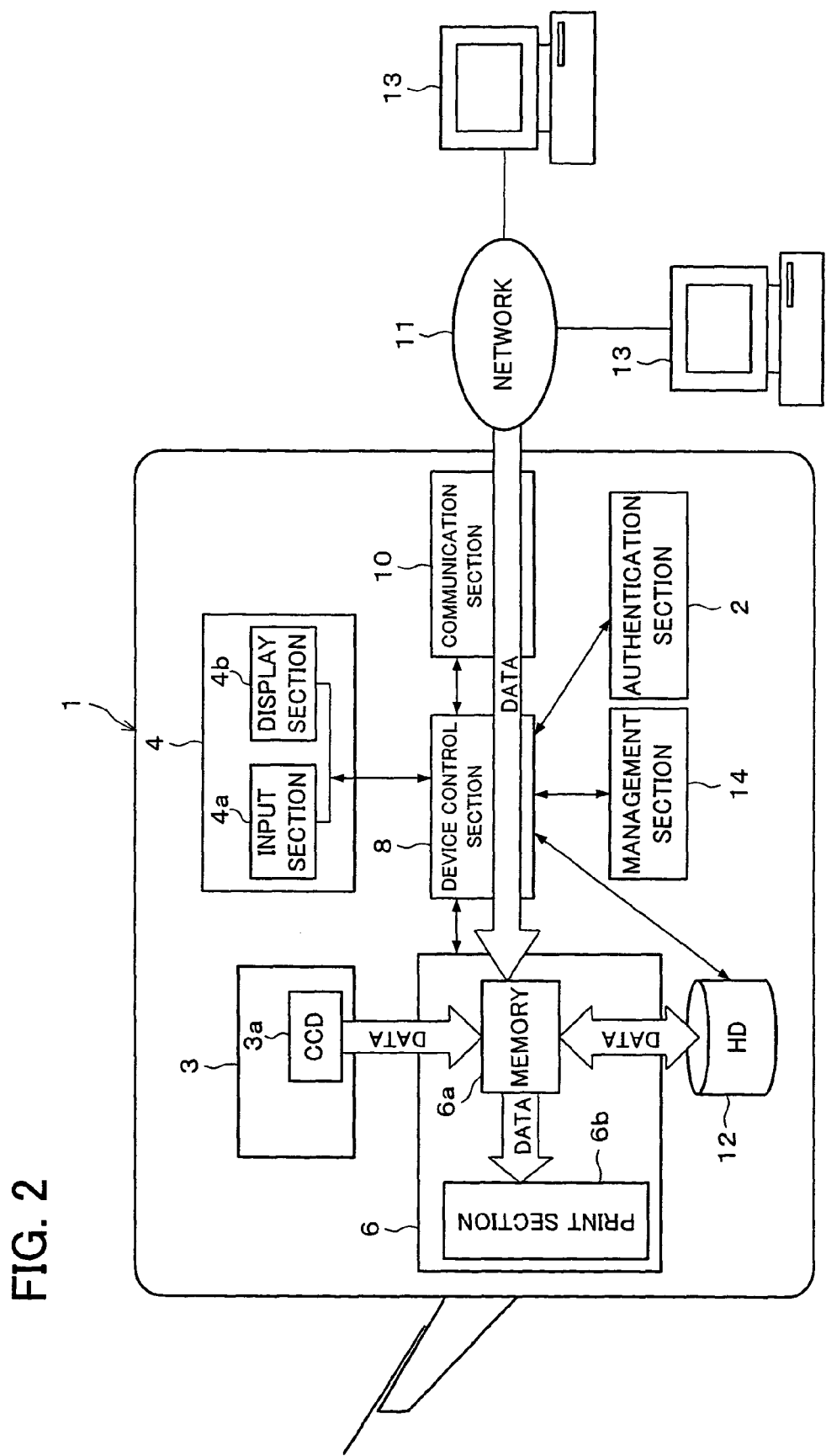
FIG. 2 is a block diagram showing a digital multifunction device of the present invention and its peripheral equipment.

To begin with, the following will describe a structure of the digital multifunction device in the present embodiment. FIG. 2 is a block diagram showing the digital multifunction device of the present invention and its peripheral equipment. As shown in FIG. 2, a digital multifunction device 1 of the present embodiment includes an image processing section, an authentication section 2 related to security control, an operation section 4 related to the whole digital multifunction device 1, a device control section 8, a hard disk (hereinafter referred to "HD") 12, and a management section (time management section) 14. The image processing section has an image reading section 3, an image forming section 6, and a communication section 10, which are used in operating functions of copy, fax, printer, and scanner. In addition, the digital multifunction device 1 is connected via a network 11 such as LAN to an external device such as personal computer (hereinafter referred to as "PC") 13.

Note that, the following will begin with description of an arrangement related to security control of the digital multifunction device 1, and description of an arrangement related to such functions as copy, fax, printer, scanner will be given later.

The authentication section 2 relates to security control of the digital multifunction device 1. The authentication section 2, in response to a request for data processing of image data, authenticates the user who has requested the image processing in accordance with authentication information on the user. A method of authentication performed in the authentication section 2 is not especially limited. For example, the authentication may be performed by comparing between information on the user, which has been previously stored in the management section 14, and information on the user inputted manually to the digital multifunction device 1. Further, the authentication information is not especially limited so long as it is information capable of identifying users individually. For example, examples of the authentication information include a personal identification code such as ID and password, biometric information such as fingerprint and voiceprint, and magnetic card with personal information recorded.

Figure 5:
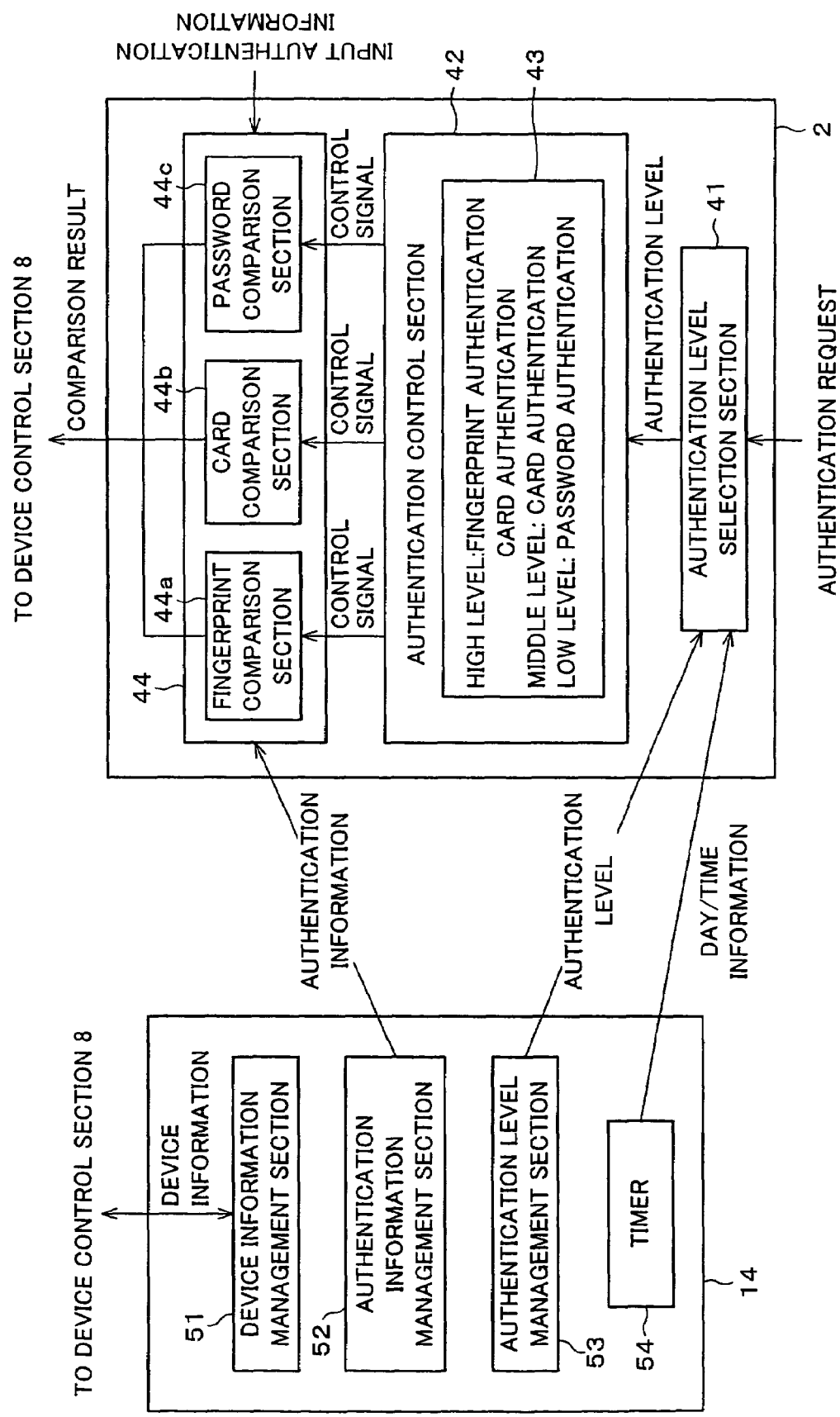
FIG. 5 is a block diagram showing details of an authentication section and a management section in the digital multifunction device.

FIG. 5 is a block diagram showing details of the authentication section 2 and the management section 14 in the digital multifunction device. Note that, FIG. 5 illustrates receipt of data in the authentication section 2 and the management section 14, omitting control by the device control section 8.

More specifically, the authentication section 2, as shown in FIG. 5, includes an authentication level selection section 41, an authentication control section 42, and a comparison section 44.

The authentication level selection section 41 reads out information on day and time managed by a timer 54 in the management section 14, as will be described later, and information on authentication level set in accordance with time of the day and day of the week, which is managed by the authentication level management section 53 in the management section 14, and selects the authentication level in accordance with the read information.

The authentication control section 42 controls the comparison section 44 so that user authentication is performed in accordance with the authentication level selected by the authentication level selection section 41 by an authentication method set for each authentication level. To perform such a control of the comparison section 44, the authentication control section 42 has a menu 43 of the authentication methods set respectively for the authentication levels. In the menu 43, the authentication methods are set respectively for the authentication levels: high level, middle level, and low level, which are set in accordance with a relative reliance upon authentication for the protection against unauthorized use of image data. Specifically, for example, it is set in the menu 43 that when the authentication level is high level, fingerprint authentication and card authentication are used for the authentication method, when the authentication level is middle level, card authentication is used for the authentication method, and when the authentication level is low level, password authentication is used for the authentication method.

The comparison section 44 includes a fingerprint comparison section (biometric information comparison section) 44a, a card comparison section 44b, and a password comparison section (personal identification code comparison section) 44c, which are provided for each of the authentication methods. The fingerprint comparison section 44a compares user's fingerprint information inputted to the digital multifunction device 1 with the authentication information on fingerprint stored in the authentication information management section 52 in the management section 14, as will be described later. The card comparison section 44b compares, for example, personal information recorded in the magnetic card which is read by the digital multifunction device 1 with authentication information on personal information stored in the authentication information management section 52. The password comparison section 44c compares a password inputted to the digital multifunction device 1 by the user with authentication information on password stored in the authentication information management section 52.

Note that, in the present embodiment, the above-arranged authentication section 2 is provided in the digital multifunction device. However, it may be provided separately from the digital multifunction device.

The operation section 4 has an input section 4a including various input key and a display section 4b including a display means such as liquid crystal display (LCD). The input section 4a receives an instruction for operation and others from the user of the digital multifunction device 1 as well as receives input of user's authentication information. The display section 4b displays to the user the operational status and setting conditions of the digital multifunction device 1. Note that, detail description of the operation section 4 will be given later with reference to FIGS. 3 and 4.

The device control section 8 monitors operations of the sections constituting the digital multifunction device 1 as well as controls the whole digital multifunction device 1 so that the digital multifunction device 1 performs proper operations.

The HD 12 is storage means including a magnetic storage medium, for example. The HD 12 performs a receipt of image data inputted to the digital multifunction device 1 with a memory 6a in the image forming section 6, as will be described later.

The management section 14 manages information necessary for the control of the sections in the digital multifunction device 1 by the device control section 8. Specifically, the information includes information on the image reading section 3, the image forming section 6, and the communication section 10, as will be described later, and information on the authentication section 2, the operation section 4, and the HD 12. In addition, the management section 14 includes stored therein authentication information for authenticating users permitted to use the digital multifunction device 1 and users permitted to use image data inputted to the digital multifunction device 1 and information on authentication levels set in accordance with the above mentioned day of time and day of the week. Furthermore, the management section 14 manages day (calendar) including months, dates, days, and national holidays and time.

As shown in FIG. 5, more specifically, the management section 14 includes a device information management section 51, an authentication information management section 52, an authentication level management section 53, and the timer (time management section) 54. The device information management section 51 manages information necessary for the control of the sections in the digital multifunction device 1. The authentication information management section 52 includes stored therein authentication information including a personal identification code such as ID and password, biometric information such as fingerprint and voiceprint, and personal information recorded in the magnetic card and others. The authentication level management section 53 includes stored therein information on authentication level set in accordance with time of the day and day of the week. Further, the timer 54 measures day and time.

Therefore, as details will be described later, kinds of information managed by the device information management section 51, the authentication information management section 52, the authentication level management section 53, and the timer 54 in the management section 14 are read out accordingly in response to a request from the device control section 8, the authentication section 2, and others. Then, in accordance with the information that has been read out performed are control of the sections in the digital multifunction device 1 by the device control section 8 and control of the comparison section 44 by the authentication control section 42.

Figure 3:
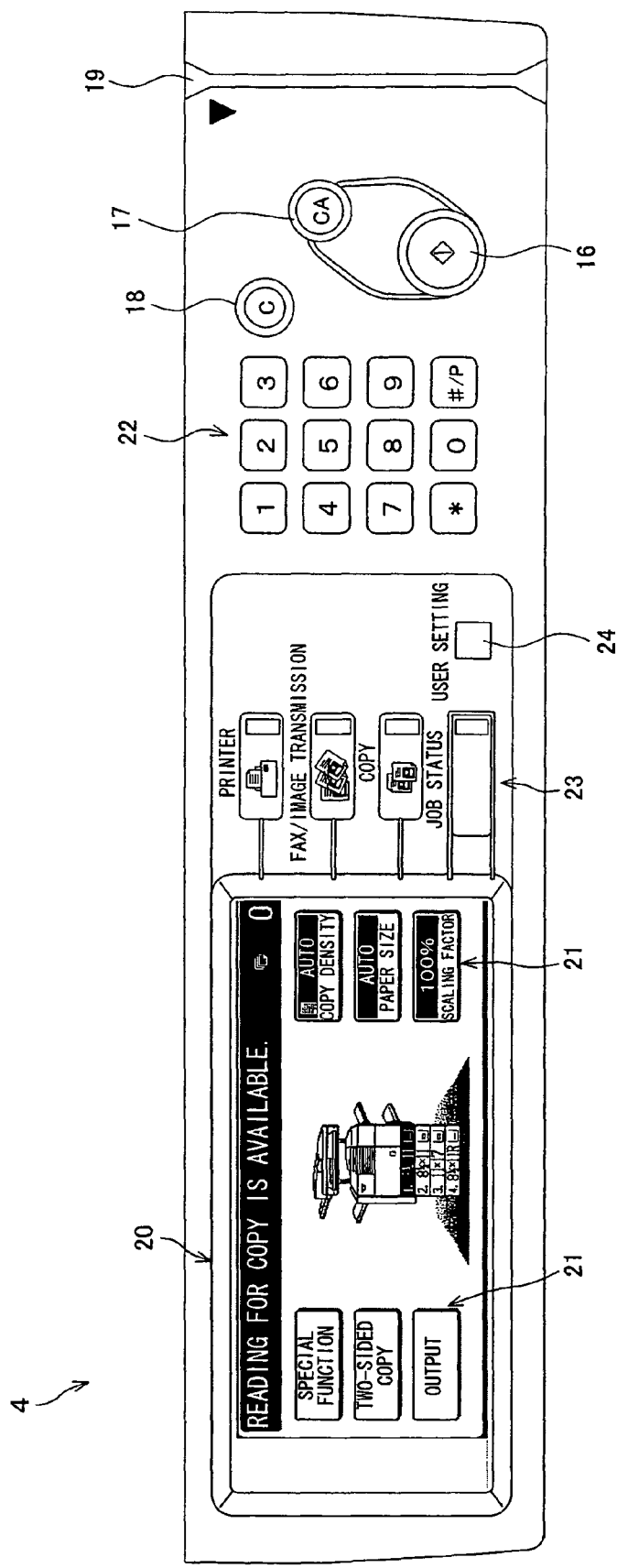
FIG. 3 is a plan view showing a display section of the digital multifunction device.

Next, the operation section 4 will be described with reference to FIGS. 3 and 4. The operation section 4 of the digital multifunction device 1, as shown in FIG. 3, a display panel 20 as the display section 4b, operation keys for carrying out setting for various modes of the digital multifunction device 1 as the input section 4a, and a card reader 19 for inputting authentication information and others of users recorded in the magnetic card and others. Note that, the operation keys are touch panel keys 21 inside the display panel 20 and operation buttons provided in an area other than the display panel 20.

The display panel 20 of the operation section 4 shown in FIG. 3 is a dot matrix LCD provided with a transparent tablet on its surface. The instruction for operation is given to the digital multifunction device in such a manner that the user presses (touches) the touch panels keys 21 on the display panel 20 showing guidance information and the touch panel keys 21 while the user checks the displayed information. The guidance information and touch panels displayed on the display panel 20 change with operations by the operation keys.

For example, when a Copy key is pressed out of mode selection keys 23 as will be described later, a screen display shown in FIG. 3 is produced on the display panel 20. That is, on the display panel 20 displayed are the touch panel keys 21 for setting copy conditions including copy density, paper size, scaling factor, two-sided copy, and other various copy conditions regarding copy operation in performing copy operation in the digital multifunction device 1. Also, copy conditions set through the touch panel keys 21 and the operation buttons are displayed on the display panel 20.

The operation buttons are provided in plural in the vicinity of the display panel 20. For example, as shown in FIG. 3, the operation buttons are composed of a Start key 16 for instructing a start of operation to the digital multifunction device 1, an All Cancel key 17 for changing setting conditions of the digital multifunction device 1 back to an initial setting value (default value), a Clear key 18 for modifying information including setting conditions in the digital multifunction device 1 during input, a numeric key pad 22 for inputting numeric information including the number of copies, telephone number, ID, and personal identification number, the mode selection keys 23, and a user setting key 24.

The Start key 16 incorporates a fingerprint reading device for recognizing fingerprint information of a user. Therefore, when the user presses the Start key 16 to instruct for a start of operation to the digital multifunction device 1, user authentication can be performed by reading fingerprint information of the user.

The mode selection keys 23 are provided corresponding to the respective functions of printer, fax, and copy of the digital multifunction device 1 and provides the selection of these functions. Also, the mode selection keys 23 include a job status key for stepping the display to show on the display panel 20 a status of what data processing is presently operated in the digital multifunction device 1 and what data processing the digital multifunction device 1 is accepting (reserved job) so that the user can check the operation status of the digital multifunction device 1. Further, these mode selection keys 23 may be respectively provided LED lumps for indicating that the key has been selected.

The user setting key 24 is pressed to display on the display panel 20 a screen for setting the authentication levels used for the user authentication, the initial setting value of the digital multifunction device 1, and others. That is, when the user setting key 24 is pressed, as shown in FIG. 4, a screen for setting the authentication levels is displayed on the display panel 20, for example.

In the digital multifunction device 1 of the present embodiment, as will be described later, the authentication levels are set in accordance with time of the day and day of the week. On this account, as shown in FIG. 4, on the display panel 20 displayed are touch panel keys and a table 30 including the authentication levels set in accordance with day of the week and hour of the day.

The touch panel keys are provided respectively for setting conditions. In FIG. 4, the touch panel keys are provided for the conditions of day of the week, hour of the day, and authentication level (indicated as "LEVEL" in FIG. 4). The touch panel keys include input keys 31 for inputting setting conditions, a setting key 32 for determining the conditions inputted by the input keys 31, and an end key 33 for changing the display screen shown in FIG. 4 back to a display screen displayed before the user setting key 24 is pressed.

Figure 4:
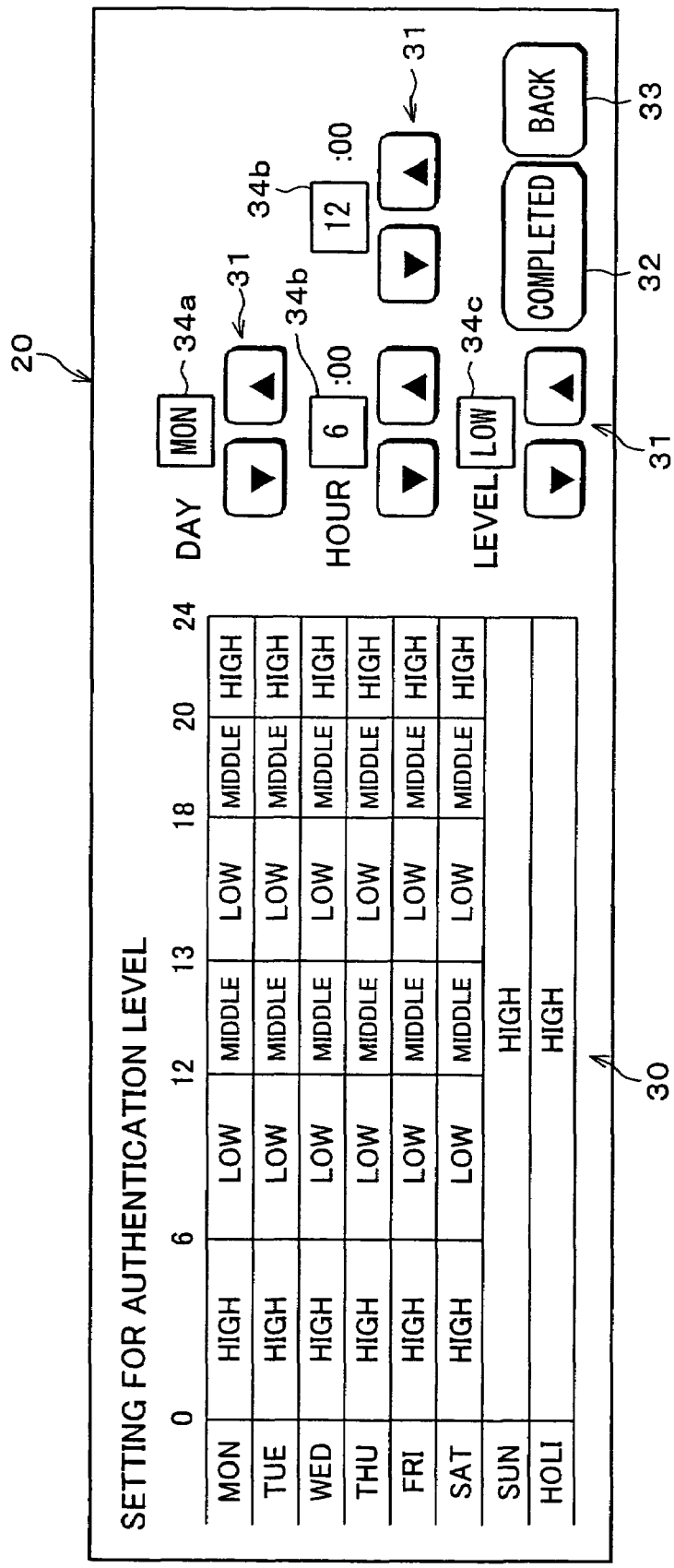
FIG. 4 is a plan view showing a display panel when an authentication level is set in the digital multifunction device.

Therefore, for example, in order to set the authentication level from 6:00 a.m. to 12:00 p.m. on Mondays to low level, as shown in FIG. 4, the user presses the input keys 31 to display "Mon" in a setting display field for day-of-the-week setting 34a and to display "6" and "12" in respective setting display fields for hour-of-the-day setting 34b. Then, the user presses the input keys 31 to display "low" in a setting display field for authentication level setting 34c. Thereafter, the conditions displayed in the setting display fields 34a through 34c are determined by pressing the setting key 32, and the table 30 reflecting the determined conditions is displayed on the display panel 20.

According to the above steps of setting authentication levels in accordance with time of the day and day of the week, the table 30 shown in FIG. 4 can be created.

Next, the following will describe the setting for authentication level of user shown in the table 30 of FIG. 4. The authentication level of user shown in the table 30 is set in accordance with a correlation between the change in the volume of data processing in the digital multifunction device 1 (FIG. 2) and the possibility of unauthorized use of image data. As described above, in order to realize the compatibility between the efficiency of data processing and the ensuring of data security, it is necessary to predict the volume of data processing requested to the digital multifunction device.

Usually, the volume of data processing requested to the digital multifunction device 1 is considered to change in proportion to the number of people who potentially use the digital multifunction device 1 (hereinafter referred to as "users"). That is, if many users exist in the neighborhood of the installation location of the digital multifunction device 1, there is a high possibility of increase in the volume of data processing requested to the digital multifunction device 1.

In many cases, the number of users existing in the neighborhood of the installation location of the digital multifunction device 1 especially changes by the time of the day and by the day of the week in a place such as office. Therefore, it is considered that prediction for the number of users of the digital multifunction device 1 by the time of the day and by the day of the week allows prediction for the volume of data processing requested to the digital multifunction device 1.

For example, at the installation location of the digital multifunction device 1 such as office, there is a high possibility that many users of the digital multifunction device 1 exist in the daytime of business days, which is working hours. It is predictable that even in the daytime of weekdays the users of the digital multifunction device 1 relatively decrease during a break time and outside working hours. Also, it is predictable that the users of the digital multifunction device 1 further decrease on a holiday such as Sunday and national holiday, as compared with business days.

Consequently, it is considered that the volume of data processing requested to the digital multifunction device 1 increases in the daytime of business days and decreases on a holiday, with change in the number of the users of the digital multifunction device 1. In addition, it is predictable that even in the daytime of business days the volume of data processing requested to the digital multifunction device 1 decreases during a break time and outside working hours.

On the contrary, it is considered that the possibility of unauthorized use of image data, such as leakage and tampering of image data, increases in reverse proportion to the number of users of the digital multifunction device 1. That is, if few users exist in the neighborhood of the installation location of the digital multifunction device 1, there is a low possibility that unauthorized use by a certain user is witnessed by other users (hereinafter referred to as "third parties"). This increases the possibility of unauthorized use of image data by a user.

On the other hand, under a situation where there exist many users of the digital multifunction device 1, which means that there exist many third parties, there is a high possibility that unauthorized use by a certain user is witnessed by the third parties. Therefore, it is considered that the possibility of unauthorized use of image data by the user decreases under such a situation.

Thus, it is considered that the possibility of unauthorized use of image data decreases in the daytime of business days in which there exist many users and the volume of data processing in the digital multifunction device is large. Further, the possibility of unauthorized use of image data increases during a break time and outside working hours of business days and on a holiday in which there exist few users and the volume of data processing is small.

Incidentally, the authentication level of image data inputted to the digital multifunction device 1 is set in accordance with importance and confidentiality of image data in order to ensure security of the image data. For example, the authentication level is set, in accordance with importance of image data, by changing authentication information used for user authentication.

That is, for image data with a high level of importance, using biometric information such as fingerprint and voiceprint enables strict user authentication. For image data with a middle level of importance, user authentication is carried out using a magnetic card recording therein such personal information that a user only knows. For image data with a low level of importance, user authentication is carried out under a relatively lenient condition using a personal identification code such as ID and password. Alternatively, user authentication may be carried out using a combination of the above authentication information in accordance with importance and confidentiality of image data. Also, the authentication level may be set by changing a digit number of the used personal identification code.

Therefore, in the case where there is a high possibility of unauthorized use of image data, it is desirable to set an authentication level with a strict condition in accordance with importance and confidentiality of image data, as described above. That is, it is desirable to perform user authentication using authentication information by which strict authentication is possible.

However, in the case where there is a low possibility of unauthorized use of image data, it is not always necessary to set an authentication level in accordance with importance and confidentiality of image data. This is because in the case where there is a low possibility of unauthorized use of image data, it is considered that it is possible to sufficiently ensure the security of image data even if user authentication is performed at an authentication level with a relatively lenient condition.

In this connection, the digital multifunction device 1 of the present embodiment performs user authentication at an authentication level with a lenient condition (low authentication level) in an environment in which there exist many users of the digital multifunction device 1, which causes a low possibility of unauthorized use of image data. Thus, user authentication is performed at a low authentication level in an environment in which it is predictable that there exist many users and the volume of data processing requested to the digital multifunction device 1 increases.

Further, the digital multifunction device 1 of the present embodiment performs user authentication at an authentication level with a strict condition (high authentication level) in an environment in which there exist few users of the digital multifunction device 1, which causes a high possibility of unauthorized use of image data. Thus, user authentication is performed at a high authentication level in an environment in which it is predictable that there exist few users and the volume of data processing requested to the digital multifunction device 1 is small.

As described above, in the digital multifunction device 1 of the present embodiment, the authentication level is selected in accordance with the possibility of unauthorized use of image data. Since the authentication level is set in accordance with the authentication information used as described above, the time required for user authentication varies depending on the authentication levels. Generally, in case of user authentication performed at a strict authentication level, the authentication information is complex and the amount of authentication information, which is the amount of authentication information required for authentication, is large. In this case, user authentication requires much more time. On the contrary, in case of user authentication performed at a relatively lenient authentication level, the authentication information is easy and the amount of authentication information is small. In this case, user authentication requires much less time.

Therefore, even if there exist many users of the digital multifunction device 1 and the volume of data processing in the digital multifunction device 1 increases, it is possible to reduce the time required for user authentication because user authentication is performed at a low authentication level. Since there is a low possibility of unauthorized use of image data in an environment in which there exit many users of the digital multifunction device 1, the security of image data can be ensured. This makes it possible to ensure the security of image data and to provide the digital multifunction device 1 which does not cause slowdowns of data processing.

Consequently, as described above, in the case where the number of users varies depending on their workdays and working hours, it is safe that the authentication levels are set as shown in the table 30 of FIG. 4 and the table 30 is stored in the authentication level management section 53 of the management section 14. That is, as shown in FIG. 4, the authentication level is set to be low level (indicated as "LOW" in FIG. 4) during the time from 6:00 a.m. to 12:00 p.m. and from 13:00 p.m. to 18:00 p.m. on Monday through Saturday, which are business days. The authentication level is set to be middle level (indicated as "MIDDLE" in FIG. 4) during a break time from 12:00 p.m. to 13:00 p.m. on a business day, and during the time of outside working hours from 18:00 p.m. to 20:00 p.m. on a business day, during which it is predictable that relatively many users exist. The authentication level is set to be high level (indicated as "HIGH" in FIG. 4) during the time from 0:00 a.m. to 6:00 a.m. and from 20:00 p.m. to 24:00 p.m. on a business day, during which it is predictable that there are few users in outside working hours of business day, and during all hours of the day on Sunday and national holiday.

In this manner, it is possible to realize the compatibility between the efficiency of data processing and the ensuring of data security by setting user authentication levels on the basis of an environment of the installation location of the digital multifunction device 1 changing in accordance with time of the day and day of the week.

Note that, in the present embodiment, the authentication levels are set in accordance with a pattern of working hours in an office. However, the authentication level set in accordance with time of the day and day of the week is not limited to this. That is, the authentication levels can be set appropriately in accordance with an environment of the installation location of the digital multifunction device 1, and desired authentication levels may be set in accordance with an environment of the installation location, changing by the time of the day and by the day of the week.

For example, instead of setting the authentication levels in accordance with a business day and a holiday, as shown in the table 30 of FIG. 4, a different authentication level may be set for each day of the week or for each date. In addition, the authentication level may be set so that the authentication level changes, for example, by the minute and by a predetermined period such as one day and a predetermined number of days, instead of by the hour of the day. Furthermore, the number of the authentication levels is not limited to three levels: high level, middle level, and low level, shown in the table 30, and it may be two levels or four levels or more.

For the authentication levels set as described above, the respective authentication methods are set in the menu 43 (shown in FIG. 5) provided in the authentication control section 42.

Note that, setting of the table 30 and the menu 43 may be made through a direct input from the operation section 4 of the digital multifunction device 1, as described above. Alternatively, the table 30 and the menu 43 may be received externally via the communication section 10, or may be supplied through insertion of a memory card or the like including the table 30 and the menu 43 stored therein into the digital multifunction device 1.

The above-arranged digital multifunction device 1 operates as below when it authenticates a user of inputted image data. That is, as shown in FIG. 2, when image data (indicated as "DATA" in FIG. 2) is supplied via the network 1 to the digital multifunction device 1, the image data is temporarily stored in the HD 12 through the memory 6a as described later under the control of the device control section 8. The device control section 8 controls the HD 12 so that the HD 12 stores the image data. Thereafter, an authentication request is made to the authentication section 2. The authentication section 2 compares authentication information on user which is previously stored in the authentication information management section 52 of the management section 14 (hereinafter referred to as "stored authentication information") with authentication information of a user which is inputted to the input section 4a (hereinafter referred to as "input authentication information") to determine the validity of the user.

At this moment, user authentication in the authentication section 2 is performed at the authentication level (the table 30 in FIG. 4) set previously in accordance with the above-described time of the day and day of the week. That is, the authentication section 2 checks day and time (hereinafter referred to as "day/time information") managed by the management section 14. Then, the authentication level, which is set in the table 30 shown in FIG. 4, is checked according to the checked day and time, and authentication is performed at an authentication level automatically changed in accordance with the checked authentication level.

More specifically, when the authentication request is made from the device information section 8 to the authentication section 2, the authentication level selection section 41 in the authentication section 2 checks the day/time information managed by the timer 54 in the management section 14. Subsequently, according to the checked day/time information, the authentication level selection section 41 checks the table 30 managed by the authentication level management section 53. With this, the authentication level selection section 41 selects any one of the authentication levels from among high level, middle level, and low level, with reference to the table 30. The authentication level selected by the authentication level selection section 41 is outputted to the authentication control section 42.

The authentication control section 42, in accordance with the authentication level selected by the authentication level selection section 41, determines an authentication method to be performed from the menu 43 for the authentication methods respectively set for the authentication levels. Then, the authentication control section 42 makes a request for user authentication of a the digital multifunction device 1 to at least one of the fingerprint comparison section 44a, the card comparison section 44b, and the password comparison section 44c, which are provided so as to perform user authentication by the determined authentication method.

In response to the request from the authentication control section 42, the device control section 8 causes a display for requesting the user of the digital multifunction device 1 to input the input authentication information to be shown on the display panel 20. As a result, according to the authentication method determined in the authentication control section 42, a display for requesting the user to input the input authentication information to the input section 4a including the start key 16, the card reader 19, and the numeric key pad 22 (not shown) is shown on the display panel 20. Thereafter, when the user input the requested input authentication information, any one of the sections in the comparison section 44 compares the input authentication information with the stored authentication information in the authentication information management section 52 of the management section 14. This comparison determines whether or not there is a match between the input authentication information matches the stored authentication information.

Then, the comparison result acquired by the determination is outputted to the device control section 8. When validity of the user is confirmed from the comparison result indicating that there is a match between the input authentication information and the stored authentication information, the device control section 8 controls so as to perform data processing in the digital multifunction device 1. On the other hand, when validity of the user is not confirmed from the comparison result indicating that there is no match between the input authentication information and the stored authentication information, a display indicating that permission for data processing is not given is shown, under the control of the device control section 8, on the display section 4b such as the display panel 20, for example.

Given description of the above with an example, when the authentication level selection section 41 of the authentication section 2 determines that it is 5:00 a.m. on Monday from the day/time information measured by the timer 54 of the management section 14, the authentication level selection section 41 checks that the authentication level is set to be "HIGH" at 5:00 a.m. on Monday in accordance with the authentication level information (the table 30 in FIG. 4) managed in the authentication level management section 53. On the basis of this, the authentication level selection section 41 selects high level as the authentication level, and the thus selected authentication level is outputted to the authentication control section 42 (FIG. 5).

In the present embodiment, in the case where the authentication level is "high" level, as shown in the menu 43 of FIG. 5, it is set to use as authentication information user's fingerprint information and user's personal information which is recorded in a magnetic card. Therefore, the authentication control section 42 request the fingerprint comparison section 44a and the card comparison section 44b to authenticate the user in accordance with the authentication method determined based on the menu 43.

That is, the fingerprint comparison section 44a requests the user to press the start key 16 shown in FIG. 4 and compares the fingerprint information of the user read by the start key 16 with the fingerprint information included in the stored authentication information. The card comparison section 44b requests the user to slip the magnetic card through the card reader 19 shown in FIG. 3 and compares the personal information recorded in the magnetic card with the personal information included in the stored authentication information.

In another example, when the authentication level selection section 41 reads out that it is 19:00 p.m. on Tuesday from the day/time information measured by the timer 54, the authentication level selection section 41 selects "middle" level as the authentication level at 19:00 p.m. on Tuesday in accordance with the table 30. Thus, when the authentication level is set to be "middle", user authentication is performed using the personal information recorded in the magnetic card as the authentication information (the menu 43 in FIG. 5).

In still another example, when the authentication level selection section 41 reads out that it is 10:00 a.m. on Friday from the day/time information measured by the timer 54, the authentication level selection section 41 selects "low" level as the authentication level at 10:00 a.m. on Friday in accordance with the table 30. When the authentication level is set to be "low", it is set to use a password as the authentication information, as shown in the menu 43 of FIG. 5. Therefore, the password comparison section 44*c* request to the user to input a password through the use of the numeric key pad 22 shown in FIG. 3 and compares the inputted password with the password included in the stored authentication information to perform the user authentication.

As described above, in accordance with the authentication level set previously, the authentication section 2 performs authentication by automatically changing the authentication level for performing user authentication. Then, when the comparison section 44 of the authentication section 2 confirms that the user is eligible for data processing, the device control section 8 controls in accordance with this comparison result so that a predetermined data processing can be executed in the digital multifunction device 1. On the other hand, when the authentication section 2 determines that the user is not eligible for data processing, the device control section 8 controls the display section 4*b* so that the display section 4*b* shows that it is impossible to confirm the identity of the user, and reports it to the user that it is impossible to perform data processing for the user.

The above operation will be described with reference to a flowchart shown in FIG. 1.

Image data are inputted to the digital multifunction device 1, and the inputted image data are stored in the HD 12 (FIG. 2). Thereafter, the device control section 8 makes an authentication request to the authentication section 2. In response to this, at the step SI, the authentication level selection section 41 of the authentication section 2 (FIG. 5) checks the day/time information managed in the management section 14. At the step S2, the authentication level selection section 41 determines whether the authentication level stored in the authentication level management section 53 of the management section 14 is high level in accordance with the day and time checked at the step S1. If the authentication level is determined to be high level at the step S2 (YES at the step S2), the authentication control section 42 requests the fingerprint comparison section 44*a* and the card comparison section 44*b* to perform user authentication, and the process goes to the step S3. At the step S3, the fingerprint comparison section 44*a* and the card comparison section 44*b* perform user authentication respectively in accordance with the finger information of user and the personal information of the user recorded in the magnetic card.

On the other hand, if the authentication level is not determined to be high level at the step S2 (NO at the step S2), the process goes to the step S4. At the step S4, the authentication level selection section 41 determines whether the authentication level stored in the authentication level management section 53 of the management section 14 is middle level in accordance with the day and time checked at the step S1. If the authentication level is determined to be middle level at the step S4 (YES at the step S4), the authentication control section 42 requests the card comparison section 44*b* to perform user authentication, and the process goes to the step S5. At the step S5, the card comparison section 44*b* performs user authentication using the magnetic card. On the other hand, if the authentication level is not determined to be middle level at the step S4 (NO at the step S4), the process goes to the step S6. At the step S6, the password comparison section 44*c* performs user authentication in accordance with the password inputted by the user.

As described above, when the user is authenticated in the comparison section 44 at any one of the steps S3, S5, and S6, the process goes to the step S7. At the step S7, the comparison section 44 determines whether or not the user is eligible from the user authentication performed at the step S3, S5, or S6. At the step 7, if it is confirmed that the user is eligible (YES at the step S7), the user authentication is completed, and data processing is performed under control of the device control section 8. On the other hand, at the step S7, if it is determined that the user is not eligible for data processing (NO at the step S7), the process goes to the step S8. At the step S8, the device control section 8 controls the display section 4*b* (FIG. 2) so that the display section 4*b* shows and reports it to the user that the identity of the user cannot be confirmed, and then, the subsequent operation to the step S2 is repeated.

Figure 1:
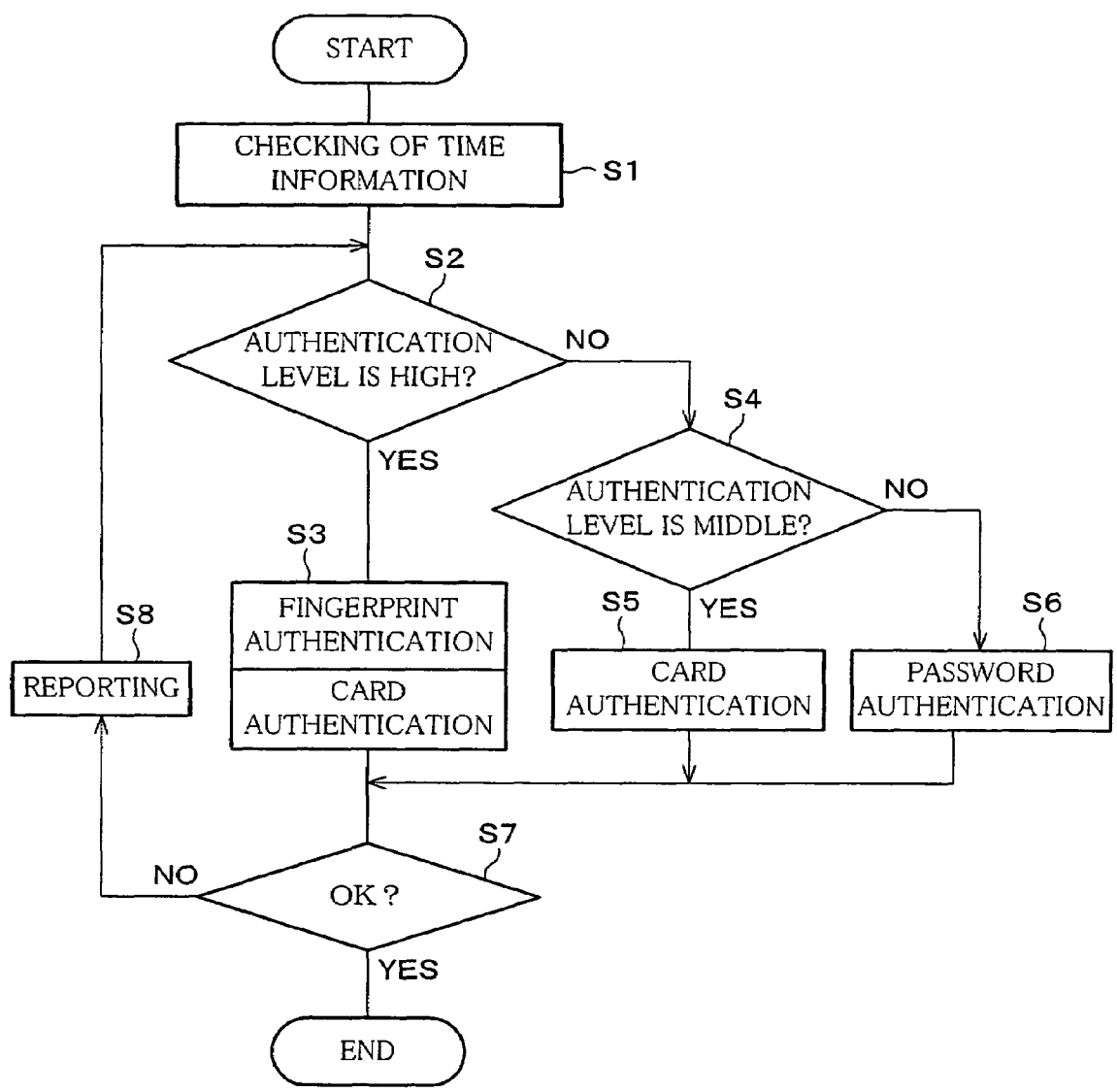
FIG. 1 is a flowchart showing a security control method in a digital multifunction device of the present invention.

Note that, in the flowchart shown in FIG. 1, although user authentication is performed with respect to all of the image data inputted to the digital multifunction device 1, the present invention is not limited to this. That is, user authentication may be performed with respect to only the image data that the user has determined the necessity of ensuring the security out of all of the image data inputted to the digital multifunction device 1.

Thus, as to the authentication level set in the digital multifunction device 1 of the present embodiment, in accordance with at least one of day and time, in the case where it is predicted that the volume of data processing is relatively large, the authentication level is set to be relatively low. In the case where it is predicted that the volume of data processing is relatively small, the authentication level is set to be relatively high.

Here, the high authentication level means that user authentication is performed in a strict condition, and the low authentication level means that user authentication is performed in a lenient condition. Therefore, adopting the above arrangement makes it possible to efficiently perform data processing of the digital multifunction device while ensuring the security of image data.

Further, in accordance with the authentication level, authentication information for use can be changed. Examples of the authentication information include biometric information such as fingerprint and voiceprint, personal information recorded in a magnetic card, and personal identification code such as ID and password. It is possible to change the authentication level with the use of a combination of these kinds of authentication information.

Furthermore, although, as described above, the authentication level selection section 41 shown in FIG. 5 checks the authentication level stored in the authentication level management section 53 of the management section 14, the present invention is not limited to this. That is, for example, it may be arranged so that the authentication level selection section 41 checks the authentication level managed in the authentication level management section 53 at predetermined time intervals for updating of the setting. In this case, it is safe that with respect to data processing requested after the authentication level selection section 41 checks the authentication level, the authentication control section 42 controls the comparison section 44 so that it performs user authentication in accordance with the authentication level previously checked by the authentication level selection section 41. This eliminates the need for checking of the authentication level by the authentication level selection section 41 with every request for data processing, thus allowing realization of efficient user authentication.

Alternatively, when the authentication level selection section 41 shown in FIG. 5 is regarded as a first authentication level selection section, the digital multifunction device 1 may be provided with a counter (counter section) for counting the number of times it has been used (frequency in use) by the unit of time and a second authentication level selection section (not shown) for changing the authentication level to low level when the frequency in use is high, changing the authentication level to middle level when the frequency in use is medium, and changing the authentication level to high level when the frequency in use is low. Then, the authentication control section 42 may compare the authentication level determined in accordance with a table by the first authentication level selection section 41 with the authentication level determined in accordance with the frequency in use by the second authentication level selection section to select a higher or lower authentication level.

With this arrangement, in the case where the higher level is selected from among the two authentication levels, it is possible to perform data processing in a state where the security is further ensured while the frequency in use is considered. In the case where the lower level is selected from among the two authentication levels, the authentication level can be automatically decreased with increase in frequency in use, so that it is possible to prevent the occurrence of a wait for data processing, thus allowing realization of efficient data processing. Thus, even in the case where any authentication level is selected, more flexible operation is possible.

Of course, it is possible to arrange so as to perform user authentication at the authentication level determined by the second authentication level selection section. In addition, the number of the authentication levels determined by the second authentication level selection section is not limited to the foregoing three levels, and it is also possible to set two levels or four or more levels.

Next, referring to FIG. 2, the following description will be given based on the image reading section 3, the image forming section 6, and the communication section 10 associated with functions of the digital multifunction device 1, including copy, fax, printer, and scanner.

The image reading section 3 scans image data, including a CCD (Charge Coupled Device) 3a, for example.

The image forming section 6, which is nonvolatile memory, for example, has a memory 6a and a print section 6b such as a laser scan unit (LSU). The memory 6a stores therein, by the page, image data (shown as "DATA" in FIG. 2) transmitted from the PC 13, which is connected to the digital multifunction device 1 via the image reading section 3, the HD 12, and the network 11. The print section 6b reads out page-by-page image data stored in the memory 6a and outputs them to a recording medium such as recording paper.

The communication section 10 controls a communication between the digital multifunction device 1 and the PC 13 installed on the network 11.

In the above-arranged digital multifunction device 1, various kinds of processing are performed to image data inputted to the digital multifunction device 1. The following will describe in order the following functions of the digital multifunction device 1: printer function, scanner function, fax function, copy function, and document file management function.

(a) Printer Function

The digital multifunction device 1, as shown in FIG. 2, is connected to the PC 13 via the network 11. When a request for print processing of image data is made from the PC 13, image data is transmitted to the communication section 10 of the digital multifunction device 1. The image data transmitted to the communication section 10 are converted on a printer board of the communication section 10 into a form enabling output to the image forming section 6. Then, one page image data are stored in the memory 6a, and this one page image data is transmitted to the HD 12 to be stored therein.

Thereafter, when the image data requested for print processing are all stored in the HD 12, the image data are transmitted from the HD 12 to the memory 6a. When the one page image data are stored in the memory 6a, this image data are transmitted to the print section 6b and subjected to print processing.

Note that, when respectively different requests for print processing are sequentially made from a plurality of PC 13 and image data are transmitted from the PCs 13 to the digital multifunction device 1, print processing is performed to the image data in the image processing section 6 in the order in which the requests for print processing are received or in the order of descending priorities.

Further, if image data such as confidential image data or secret data to which consideration for security is given are found out of the image data requested for print processing from the PC 13, the image data are temporarily stored in the HD 12 without immediately performing print processing in the image forming section 6. Thereafter, as described above, print processing is performed after authentication of a user and confirmation of the identity of the user.

(b) Scanner Function

In the image reading section 3 provided in the digital multifunction device 1, in response to a request for reading a document, reading of the document is performed by the CCD 3a, as shown in FIG. 2. At this moment, the document is electronically scanned and generated as image data. The generated image data are stored by the unit of one page in the memory 6a. Thereafter, the image data are transmitted to the HD 12 to be stored therein. When the image data of the document requested for reading are all stored in the HD 12, the image data are transmitted via the network 11 from the HD 12 to the designated PC 13. A destination of the image data is determined in such a manner that in transmitting the image data, the operation section 4 selects an address of a desired PC 13 from addresses of the PCs 13 previously registered in the management section 14 of the digital multifunction device 1.

Also in this arrangement, in case of reading a document to which consideration for security is given, it is safe that user authentication is performed before reading the document, as described above. That is, it may be arranged so that when a request for reading the document is made, a request for authentication is made to the authentication section 2, and the authentication section 2 performs user authentication. Alternatively, it may be arranged so that image data which will be transmitted are encrypted, and in using the image data by the PC 13 or the like, user authentication is performed through a password, for example.

Furthermore, in some cases, after the documents are set to the image reading section 3, the user goes back to the PC 13, and the user reading of the set document is performed in response to a reading request made from the PC 13. At this moment, after the documents are set to the image reading section 3, the user is temporarily away from the document. Therefore, it is preferable that in case of reading of the document to which consideration for security is given, the image reading section 3 is locked to prevent the document from being brought out by a third party.

(c) Fax Function

When a request for connection is made via a telephone line (not shown) from an external facsimile device to the communication section 10 of the digital multifunction device 1, image data is transmitted from the external facsimile device. The communication section 10 converts the received image data, as described in the above (a), and the image forming section 6 performs print processing to the image data. Further, in the case where the image data are transmitted to the external facsimile data, the digital multifunction device 1 calls out the external facsimile device at the destination via the telephone line. Thereafter, when the connection to the external facsimile device is confirmed, the image data are transmitted through a communication protocol.

Also in this arrangement, if image data to which consideration for security need to be given, such as confidential or secret data, are received by the digital multifunction device 1, the image data are stored in the HD 12. Thereafter, as described above, a request for authentication is made to the authentication section 2, and the authentication section 2 performs user authentication. If the identity of the user is confirmed, the image processing section 6 performs print processing to the image data. Alternatively, in the case where confidential or secret image data are transmitted, a setting for confidential transmission or secret transmission is carried out prior to transmission of the image data. Then, user authentication may be performed by the external facsimile device at the destination to ensure security of the image data.

(d) Copy Function

Copy processing of a document can be realized by a combination of the printer function described in the above (a) and the scanner function described in the above (b). That is, the image data of a document read by the image reading section 3 are stored in the HD 12 through the memory 6*a*. Thereafter, the image forming section 6 performs print processing of the image data, whereby the image data are reproduced onto a recording paper.

Also in this arrangement, in the case where a document to which consideration for security is given is subjected to copy processing, user authentication is performed. Specifically, in performing reading of the document, the image reading section 3 recognizes special patterns such as hidden characters embedded in the document and special patterns such as logos printed onto the document itself. Then, the above-described user authentication is performed when the device control section 8 makes an authentication request to the authentication section 2 as needed in accordance with this recognition result, thereby preventing the leakage of a copy of the document.

(e) Document File Management Function

Document file management function is function to store image data in a large-capacity auxiliary storage device such as HD 12 mounted in the digital multifunction device 1, which provides easy data rewriting. The stored image data includes image data of a document read by the image reading section 3, image data transmitted via the network 11 from the PC 13, and image data of a document transmitted and/or received via a telephone line. Further, in the HD 12, the image data inputted to the digital multifunction device 1 may be all stored as history information. Also, it is possible to arrange so that the user stores it in the HD 12 as needed.

For the storage of image data into the HD 12, image data necessary to ensure its security can be stored with the addition of information such as user restriction, addition of a password, image data encryption, and limit of a storage period.

The image data stored in the HD 12, as described above, can be outputted onto a recording paper by the image forming section 6. In this case, in accordance with a list of image data stored inside the HD 12, the user selects any image data inside the HD 12 from the operation section 4 of the digital multifunction device 1 or from the PC 13 via the network 11. Then, the image forming section 6 performs print processing of the selected image data.

Moreover, the image data stored in the HD 12 can be outputted via the network 11 to the PC 13. Also in this case, the user selects any image data inside the HD 12 from the operation section 4 of the digital multifunction device 1 or from the PC 13 via the network 11. Then, the selected image data is transmitted via the network 11 to the PC 13, which is a desired destination.

Further, the image data stored in the HD 12, as described above, can be transmitted via a telephone line to an external facsimile device. Also in this case, under a user's instruction given from the operation section 4 or the PC 13, a desired image data can be transmitted via a telephone line to a predetermined external facsimile device.

In the case where the above-described operations such as print processing, transmission of image data via the network 11 and fax transmission are provided to the image data to which consideration for security is given, it is safe that the device control section 8 makes a authentication request to the authentication section 2, and the authentication section 2 performs user authentication, as described previously.

At the end, the blocks in the digital multifunction device 1, especially, the device control section 8 and the authentication section 2 may be realized by hardware logic or by software using CPU as described below.

That is, the digital multifunction device 1 includes CPU (Central Processing Unit) for executing instructions of a control program realizing the performance of the functions, ROM (Read Only Memory) for storing the program therein, RAM (Random Access Memory) for developing a program, and a storage device (recording medium) such as memory storing the program and various data therein. An object of the present invention can be also achieved in such a manner that a computer-readable recording medium storing therein program codes (execute form program, intermediate code program, source program) of a control program for the digital multifunction device 1, which is software for realizing the aforementioned functions, is supplied to the digital multifunction device 1, and a computer (or CPU and MPU) of the digital multifunction device 1 reads out and executes program codes stored in the recording medium.

For example, the recording medium can be a tape medium including magnetic tape and cassette tape; a disk medium including magnetic disk such as floppy® (disk and hard disk and optical disk such as CD-ROM, MO, MD, DVD, and CD-R; a card medium including IC card (including memory card) and optical card; or a semiconductor memory including mask ROM, EPROM, EEPROM, and flash ROM.

The digital multifunction device 1 may be arranged to connect to the communication network to supply the above program codes to the digital multifunction device 1 via the communication network. As the communication network, which is not especially limited, available are, for example, Internet, Intranet, Extranet, LAN, ISDN, VAN, CATV communication network, virtual private network, telephone line network, mobile communication network, and satellite communication network Moreover, as a transmission medium, which is not especially limited, available are, for example, wired lines such as IEEE1394, USB, power-line carrier, CATV line, telephone line, and ADSL line and wireless lines such as infrared rays for IrDA and remote control, Bluetooth, IEEE802.11, HDR, mobile telephone network, satellite line, and terrestrial digital network. Note that, the present invention can be also realized when the program codes are in the form of carrier wave embodied by electronic transmission or data signal strings.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. An image processing device comprising:
   a management section for storing an authentication level set in accordance with at least one of day and time;
   an authentication section for changing the authentication level to perform user authentication in accordance with at least one of day and time;
   an image processing section for performing requested image processing to image data in accordance with a result of authentication by the authentication section; and
   a time management section for managing at least one of day and time;
   wherein
      the authentication level is set in accordance with a volume of image processing which is predicted in accordance with at least one of day and time,
      in cases where the volume of the image processing is not less than a predetermined value, the authentication level for the user authentication is set at a first condition
      in cases where the volume of image processing is less than the predetermined value, the authentication level for the user authentication is set to be more strict than the first condition, and
      a change in a volume of data processing is correlated with a possibility of unauthorized use of the image data.

2. The image processing device according to claim 1, wherein:
   the management section stores a table which is set so that the authentication level can be selected in accordance with at least one of day and time.

3. The image processing device according to claim 2, wherein:
   the authentication section includes an authentication level selection section for checking at least one of day and time which are managed in the time management section and selecting an authentication level in accordance with at least one of the day and time checked and the table.

4. The image processing device according to claim 1, wherein:
   the authentication section includes at least one of a biometric information comparison section for authenticating biometric information of a user, a card comparison section for authenticating information recorded in a card possessed by a user, and a personal identification code comparison section for authenticating an inputted personal identification code.

5. The image processing device according to claim 4, wherein:
   the biometric information comparison section is a finger print comparison section for performing authentication in accordance with a fingerprint of a user.

6. The image processing device according to claim 4, wherein:
   the personal identification code comparison section is a password comparison section for performing authentication in accordance with a password inputted by a user.

7. The image processing device according to claim 4, wherein:
   the authentication level includes three levels, high level, middle level, and low level, which are set in accordance with preselected levels of security of reliance to be placed upon the authentication for protection against unauthorized use of image data.

8. The image processing device according to claim 7, wherein:
   in the case where the authentication level is high level, the authentication section performs user authentication in the biometric information comparison section and the card comparison section.

9. The image processing device according to claim 7, wherein:
   in the case where the authentication level is middle level, the authentication section performs user authentication in the card comparison section.

10. The image processing device according to claim 7, wherein:
    in the case where the authentication level is low level, the authentication section performs user authentication in the personal identification code comparison section.

11. An image processing method comprising:
    authentication step of changing an authentication level set previously in accordance with at least one of day and time to perform authentication of a user; and
    image processing step of performing requested image processing to image data in accordance with a result of the authentication;
    wherein:
       the authentication step is performed at an authentication level set in accordance with a volume of image processing which is predicted in accordance with at least one of day and time;
       in cases where the volume of the image processing is not less than a predetermined value, the authentication level for the user authentication is set at a first condition,
       in cases where the volume of image processing is less than the predetermined value, the authentication level for the user authentication is set to be more strict than the first condition, and a change in a volume of data processing is correlated with a possibility of unauthorized use of the image data.

12. The image processing method according to claim 11, wherein:
the authentication step includes authentication level selection step of reading out as day/time information at least one of day and time and selecting an authentication level in accordance with the day/time information.

13. The image processing method according to claim 11, wherein:
the authentication step includes at least one of biometric information comparison step of authenticating biometric information of a user, card comparison step of authenticating information recorded in a card possessed by a user, and personal identification code comparison step of authenticating an inputted personal identification code.

14. The image processing method according to claim 11, wherein:
the authentication step is performed at any one authentication level of three levels, high level, middle level, and low level, which are set in accordance with preselected levels of security of reliance to be placed upon the authentication for protection against unauthorized use of image data.

15. A preprogrammed computer functioning as an image processing device including a management section for storing an authentication level set in accordance with at least one of day and time, an authentication section for changing the authentication level to perform user authentication in accordance with a volume of image processing predicted in accordance with at least one of day and time, and an image processing section for performing requested image processing to image data in accordance with a result of authentication by the authentication section;
wherein:
in cases where the volume of the image processing is not less than a predetermined value, the authentication level for the user authentication is set at a first condition,
in cases where the volume of image processing is less than the predetermined value, the authentication level for the user authentication is set to be more strict than the first condition, and
a change in a volume of data processing is correlated with a possibility of unauthorized use of the image data.

16. A computer-readable recording medium storing an image processing program for operating an image processing device, causing a computer to function as a management section for storing an authentication level set in accordance with a volume of image processing which is predicted in accordance with at least one of day and time, an authentication section for changing the authentication level to perform user authentication in accordance with at least one of day and time, and an image processing section for performing requested image processing to image data in accordance with a result of authentication by the authentication section;
wherein:
in cases where the volume of image processing is not less than a predetermined value, the authentication level for the user authentication is set at a first condition,
in cases where the volume of image processing is less than the predetermined value, the authentication level for the user authentication is set to be more strict than the first condition, and
a change in a volume of data processing is correlated with a possibility of unauthorized use of the image data.

* * * * *